May 20, 1969 R. F. DAVIS, JR 3,444,887
CHECK VALVE
Filed Aug. 26, 1966
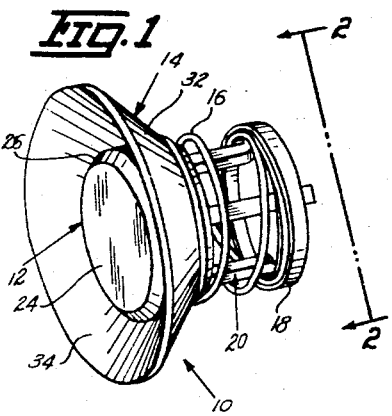
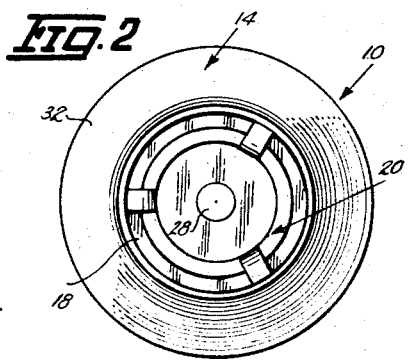
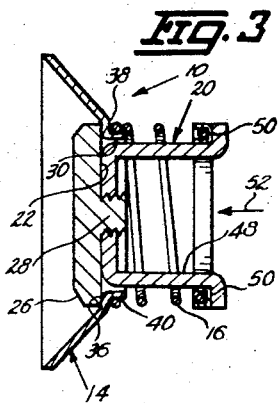
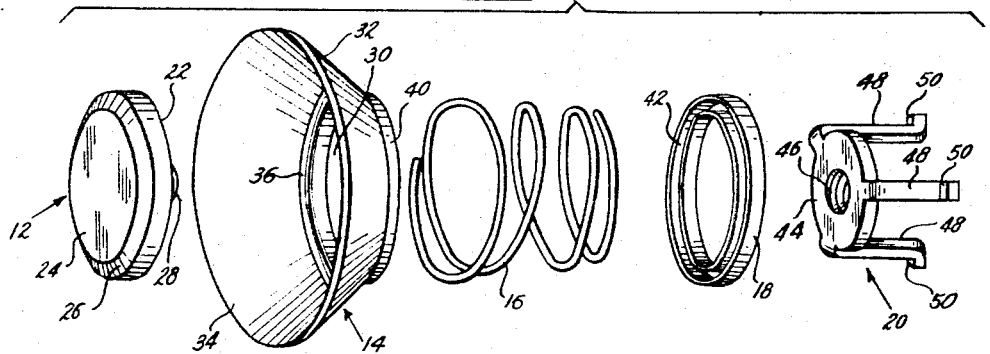
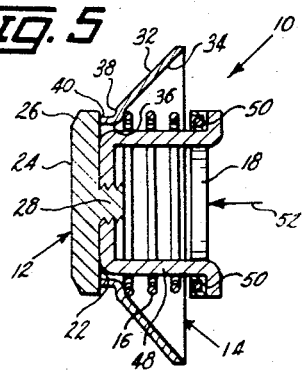
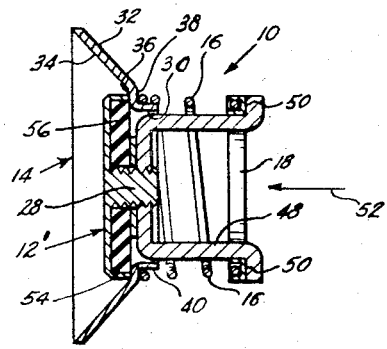
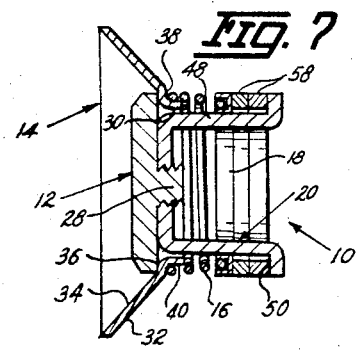
INVENTOR.
ROY FORREST DAVIS, JR.
BY
ATTORNEY.

United States Patent Office 3,444,887
Patented May 20, 1969

3,444,887
CHECK VALVE
Roy Forrest Davis, Jr., 704 Winegardner Road,
Des Moines, Iowa 50317
Filed Aug. 26, 1966, Ser. No. 575,368
Int. Cl. F16k 15/12, 17/04, 21/16
U.S. Cl. 137—541                       9 Claims

ABSTRACT OF THE DISCLOSURE

A spring-loaded check valve having multiple parts susceptible of fabrication on a press and die for individual replacement. Includes a housing with a flow opening having a valve seat on opposite sides thereof and valve means mountable selectively relative to either valve seat for effective valve action from either of two opposite directions. The valve means is also adjustable for flow control.

---

This invention relates to check valves for use in water, gas, air or hydraulic flow lines and is an improvement over the valve shown in Patent No. 2,956,584 of which I am one of the joint inventors.

The primary object of this invention is to provide a new and improved check valve that is highly efficient in operation and yet is extremely economical to manufacture.

More particularly it is an object herein to provide a new check valve that can be made on a press and die from any metal susceptible of being shaped by such method.

In many valves when replacement of parts is necessary, it is frequently the case that one part or unit may have multiple functions and by reason of its manufacture as a single part, the entire part must be replaced when only one phase may have become worn or damaged. Accordingly, in this regard, another object herein is to provide a check valve as characterized which includes a plurality of individual relatively inexpensive parts that can be easily assembled and disassembled and which can be easily and quickly replaced as separate items so as to reduce the cost of maintenance and repair.

Still another object herein is to provide a novel housing which is provided with a valve seat means on opposed sides of a flow opening whereby such housing is reversible to use either seat, and in situations where such housing may be locked in place in a flow line, the valve operating components can be reversed relative to the housing to prevent retrograde flow in either direction desired.

A further object is to provide a check valve as characterized which can be easily adjusted to regulate the degree to which it will open.

To attain these objects and such further objects as may appear herein, or be hereinafter pointed out, reference is made to the accompanying drawings forming a part hereof, in which:

FIG. 1 is a perspective view of a preferred embodiment of this new check valve,

FIG. 2 is an end view thereof taken from the line 2—2 FIG. 1,

FIG. 3 is a longitudinal sectional view of the valve shown in FIG. 1,

FIG. 4 is an exploded perspective view of this check valve to more clearly illustrate the several parts comprising the same, FIG. 5 is similar to FIG. 1 but showing the housing in reversed position relative to its position in FIG. 1, FIG. 6 is a view similar to FIG. 3 showing a modification of the valve cap to include a resilient insert, and FIG. 7 is a view similar to FIG. 3 showing the valve adjusted for a restricted opening.

Referring to the drawings, this new check valve is designated generally by the numeral 10 and as best seen in FIG. 4, includes a valve cap 12, a housing 14, an annular resilient member in the form of the coil spring 16, a spring retaining ring 18 and a spring support or guide which I have called the yoke 20. Each of these parts while susceptible of fabrication in variety of ways and from different materials, is preferably designed to be made on a press and die from any metal which can be shaped by such methods.

Cap 12 is a flat disc member presenting the flat bottom side 22 for seating in housing 14 as will later appear and the top side 24 may be beveled as at 26 if desired. Axially projecting from the bottom side 22 of cap 12 is the threaded stub shank 28 for attachment to yoke 20 as shown in FIGS. 3 and 5–7.

Housing 14 is preferably of a dished configuration as shown having the axial opening or passageway 30 and defines the outer convex surface 32 and the inner concave surface 34 and thus in general is somewhat funnel shaped. In this regard, it will be understood that housing 14 may be cylindrical as is commonly used for such parts and may also be integrally formed or otherwise affixed within any conduit or pipe in which a check valve is desired rather than shown as a separate part in the valve assembly as I have illustrated.

The inner surface 34 of housing 14 terminates at its inner end in the annular shoulder 36 which defines the opening 30 relative to the inner side of housing 14 and serves in one capacity as a valve seat and in another capacity as an abutment or anchor means for spring 16 as will be later referred to in more detail. Likewise, the outer surface 32 of housing 14 terminates in the inwardly extending annular shoulder 38 which is opositely disposed to shoulder 36, an integral with the inner edge of shoulder 38 is the axially projecting circular neck 40 which defines the opening relative to the outer side of housing 14 and serves respectively as a valve seat and a guide for seating spring 16 on shoulder 38 at times as will appear.

Spring 16 is a conventional helical compression type spring and ring 18 is channel shaped in cross section to provide the circular track 42 as best seen in FIG. 4. Yoke 20 comprises a flat disc member or plate 44 which has the threaded axial opening 46 for threadedly receiving the stub shank 28, and member 44 includes a plurality of elongated fingers 48 arranged in circumferentially like spaced relationship around member 44 so as to extend a like distance in the same direction parallel to the axis of opening 46. The free ends of each finger 48 are turned outwardly and upwardly to provide the channel portion 50.

In assembling the several components of valve 10 as described, ring 18 is passed over yoke member 44 so that the closed side of the ring is nested in the respective channels 50 of the several fingers 48. Track 42 is thus oriented toward plate 44 and ring 18 is freely rotatable relative to fingers 48 and freely movable longitudinally thereon. Spring 16 is then passed over plate 44 so that the smaller end of the spring is nested in track 42 of ring 18 and supported thereby at one end. Thus far described, the yoke 20, spring 16 and ring 18 can be mounted to housing 14 either as shown in FIGS. 1, 3, 4 and 6 or as seen in FIG. 5. With reference to FIG. 3 for illustration of one form of arrangement, the large end of spring 16 is passed over neck 40 to abut or seat against shoulder 38 and cap 12 is then threadably engaged in opening 46 from the opposite side of opening 30 in housing 14 whereby such cap is seated on shoulder 36 and spring 16 will normally urge it into closed position. By this arrangement, it will be seen that the widest end of housing 14 is disposed in the same direction as the path of flow indicated by the arrow 52. When it is desired to reverse the position of housing 14 as described, and as shown in FIG. 5, the large end of spring 16 is seated on shoulder 36 and cap 12 is threadably engaged in opening 46 of plate 44 from the opposite side of opening 30 whereby such cap is seated on the periphery of neck 40 and in this arrangement, the widest end of housing 14 is disposed toward the direction from which the flow will come as indicated by the arrow 52. It will thus be appreciated that cap 12, spring 16, ring 18 and yoke 20 can be mounted to housing 14 from either side of opening 30 and in situations, for example, where housing 14 may be secured within a pipe line, the other components of valve 10 can be selectively arranged relative to either side of opening 30 to prevent retrograde flow in either direction desired.

The diameter across neck 40 is slightly reduced relative to the diameter of opening 30 defined by shoulder 36 and this provides a like diameter defined by the respective shoulders 36 and 38 so that both shoulders will accommodate the large end of spring 16 as described.

Valve cap 12 as so far described, provides a metal to metal contact with shoulder 36 (FIG. 3) and neck 40 (FIG. 5) and while this has proved satisfactory, a resilient seating surface for cap 12' may sometimes be desired and accordingly in FIG. 6 I have shown cap 12 provided with a recessed pocket 54 for receiving a suitable resilient insert 56.

With reference now to FIG. 7, I have illustrated the adjustable feature of this valve 10 whereby the movement of the cap 12 can be limited to provide a restricted flow through opening 30 if desired and this is accomplished by placing one or more rings or washers 58 around fingers 48 intermediate ring 18 and the hooked ends of such fingers. This is permitted by the slidability of ring 18 and by placing one or more washers 58 as described, spring 16 can be normally compressed to any desired degree so as to normally move ring closer to housing 14. By this arrangement, the distance of travel of yoke 20, which unseats the cap 12 can be limited as should be apparent by the abutment of ring 18 against housing 14 and the corresponding flow opening at 30 afforded by the movement of the cap can be likewise restricted.

Accordingly, from the foregoing it is thought a full understanding of construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A check valve, comprising:
a housing provided with an opening,
a valve seat carried by said housing at one side of said opening,
a yoke member movably disposed in said housing through said opening, said yoke member including:
a plate,
a plurality of fingers extending from said plate in spaced relationship about the periphery thereof,
the outer ends of said fingers being turned outwardly and upwardly to define a channel,
a ring slidable on said fingers and limited in one direction of movement by said channels,
a spring on said fingers intermediate said ring and said housing,
and a cap member secured to said plate so as to be movable therewith and normally held in sealing engagement with said valve seat by said spring.

2. A valve as defined in claim 1 wherein said ring is channel shaped in cross section to define a track for the seating of one end of said spring.

3. A valve as defined in claim 1 including:
a second valve seat on the other side of said opening, and
said yoke member being selectively mounted to said housing from either side of said opening so that said cap can cooperate with either selected valve seat and thereby prevent a retrograde flow through said opening from either direction.

4. A valve as defined in claim 1 including means on said yoke member to selectively restrict the distance of movement of said cap relative to said valve seat.

5. A valve as defined in claim 1 including means on said yoke member to selectively position said ring at any predetermined point on said fingers and thereby restrict its distance of movement towards said housing whereby the movement of said cap member is correspondingly restricted relative to said valve seat.

6. A valve as defined in claim 5 including a selected number of washers mounted on said fingers intermediate said ring and said channels.

7. A check valve, comprising:
a housing provided with flow opening,
a respective valve seat on said housing at each side of said opening,
a yoke member movably arranged in said housing and selectively disposed through said opening from either direction, and
a cap member secured to said yoke member so as to be movable therewith and normally in sealing engagement with one of said valve seats.

8. A valve as defined in claim 7 wherein said yoke member is selectively reversible relative to its position in said opening to selectively prevent retrograde flow through said opening from either direction.

9. A valve as defined in claim 7 including means on said yoke member effective to restrict the movement of said cap member relative to said valve seat.

References Cited

UNITED STATES PATENTS

| | | | |
|---|---|---|---|
| 951,970 | 3/1910 | Schrode | 137—270 |
| 2,072,271 | 3/1937 | Meadows | 137—541 |
| 2,956,584 | 10/1960 | Anderson et al. | 137—541 |
| 2,966,923 | 1/1961 | Fennema | 137—270 |

NATHAN L. MINTZ, *Primary Examiner.*